(12) United States Patent
Dames

(10) Patent No.: US 9,374,992 B2
(45) Date of Patent: Jun. 28, 2016

(54) LOW PIVOTING BOOM ASSEMBLY

(71) Applicant: Matthew W. Dames, Clarion, IA (US)

(72) Inventor: Matthew W. Dames, Clarion, IA (US)

(73) Assignee: Hagie Manufacturing Company, Clarion, IA (US)

( * ) Notice: Subject to any disclaimer, the term of this patent is extended or adjusted under 35 U.S.C. 154(b) by 227 days.

(21) Appl. No.: 14/133,856

(22) Filed: Dec. 19, 2013

(65) Prior Publication Data

US 2015/0173343 A1 Jun. 25, 2015

(51) Int. Cl.
*A01M 7/00* (2006.01)
*A01C 23/00* (2006.01)

(52) U.S. Cl.
CPC ............ *A01M 7/0053* (2013.01); *A01C 23/008* (2013.01)

(58) Field of Classification Search
CPC . A01M 7/0053; A01M 7/0071; A01C 23/047
USPC ................................................. 239/159–168
See application file for complete search history.

(56) References Cited

U.S. PATENT DOCUMENTS

| 4,646,972 A | * | 3/1987 | McGregor | .......... | A01M 7/0053 239/168 |
| 8,998,106 B2 | * | 4/2015 | Joris | .................... | A01M 7/0053 239/159 |
| 2012/0273591 A1 | * | 11/2012 | Honermann | ........ | A01M 7/0053 239/159 |

* cited by examiner

*Primary Examiner* — Arthur O Hall
*Assistant Examiner* — Viet Le
(74) *Attorney, Agent, or Firm* — Brett J. Trout

(57) ABSTRACT

Methods, systems, and apparatuses for rotating a boom assembly relative to an agricultural vehicle. The system is arranged with a fixed transom and rotating transom wherein the rotating transom has a pivot point positioned below both fixed and rotating transoms. The system is provided with a plurality of rotors and tracks to allow the pivot point to be positioned lower than that of prior art systems to allow the boom assembly to more accurately track the contours of row crops in undulating landscapes.

16 Claims, 6 Drawing Sheets

LOW PIVOTING BOOM ASSEMBLY

TECHNICAL FIELD

The present invention relates, in general, to an agricultural vehicle with a boom attachment and, more particularly, to an agricultural vehicle having a low pivoting attachment for a boom assembly.

BACKGROUND OF THE INVENTION

Spray booms are known in the art for use in association with various agricultural pursuits, including spraying plants with fertilizer, herbicides, and the like. Such systems typically involve a generally horizontal boom provided with several sprayers. It is desirable to provide a spray boom with as many depending implements as possible to treat as many rows as possible during a single pass of the spray boom. As the spray boom moves over uneven terrain, it is desirable to pivot the spray boom to track undulations in the agricultural field.

Pivoting spray boom assemblies are known in the art. Spray boom assemblies are typically coupled to an agricultural vehicle by a four-bar linkage system from which spray boom assemblies may be attached and detached. Spray booms may be pivotally attached to the four-bar linkage assemblies so that the operator may pivot the spray boom to better coincide with contours of the agricultural field. It is known to pivotally couple the top of the agricultural spray boom assembly to the top of the four-bar linkage assembly to allow for the pivoting of the spray boom assembly. One drawback associated with such prior art assemblies is that by placing the pivoting mechanism at the top of the spray boom assembly, the pivot point is well above the agricultural row crops being worked. Accordingly, this high pivot point does not allow the operator to level the boom assembly relative to the agricultural field but, instead, places the ends of the boom assembly too low when the boom assembly is pivoted downward, and too high when the pivot assembly is pivoted upward relative to the center of the boom assembly.

It would be desirable, therefore, to place the pivot point of the boom assembly lower, thereby allowing the operator to more accurately match the level of the boom assembly with the contour of the agricultural field.

SUMMARY OF THE DISCLOSED SUBJECT MATTER

Methods, systems, and products for attaching an agricultural boom assembly to an agricultural vehicle are disclosed herein. According to an exemplary embodiment, an agricultural vehicle is provided with a frame attached to a boom support. A boom assembly is pivotally attached to the boom support in a manner where the lower portion of the boom support is pivotally coupled to the lower portion of the boom assembly.

BRIEF DESCRIPTION OF THE DRAWINGS

Embodiments are described with reference to the accompanying drawings. In the drawings, like reference numerals may include identical or functionally similar elements.

DETAILED DESCRIPTION OF THE DRAWINGS

Disclosed herein is a system for pivotally attaching a boom assembly to an agricultural vehicle. While there are many ways to attach a boom assembly to an agricultural vehicle, it is beneficial to attach the boom assembly with a low pivot point to allow the boom assembly to more accurately follow the contours of an agricultural field.

Figure 1:
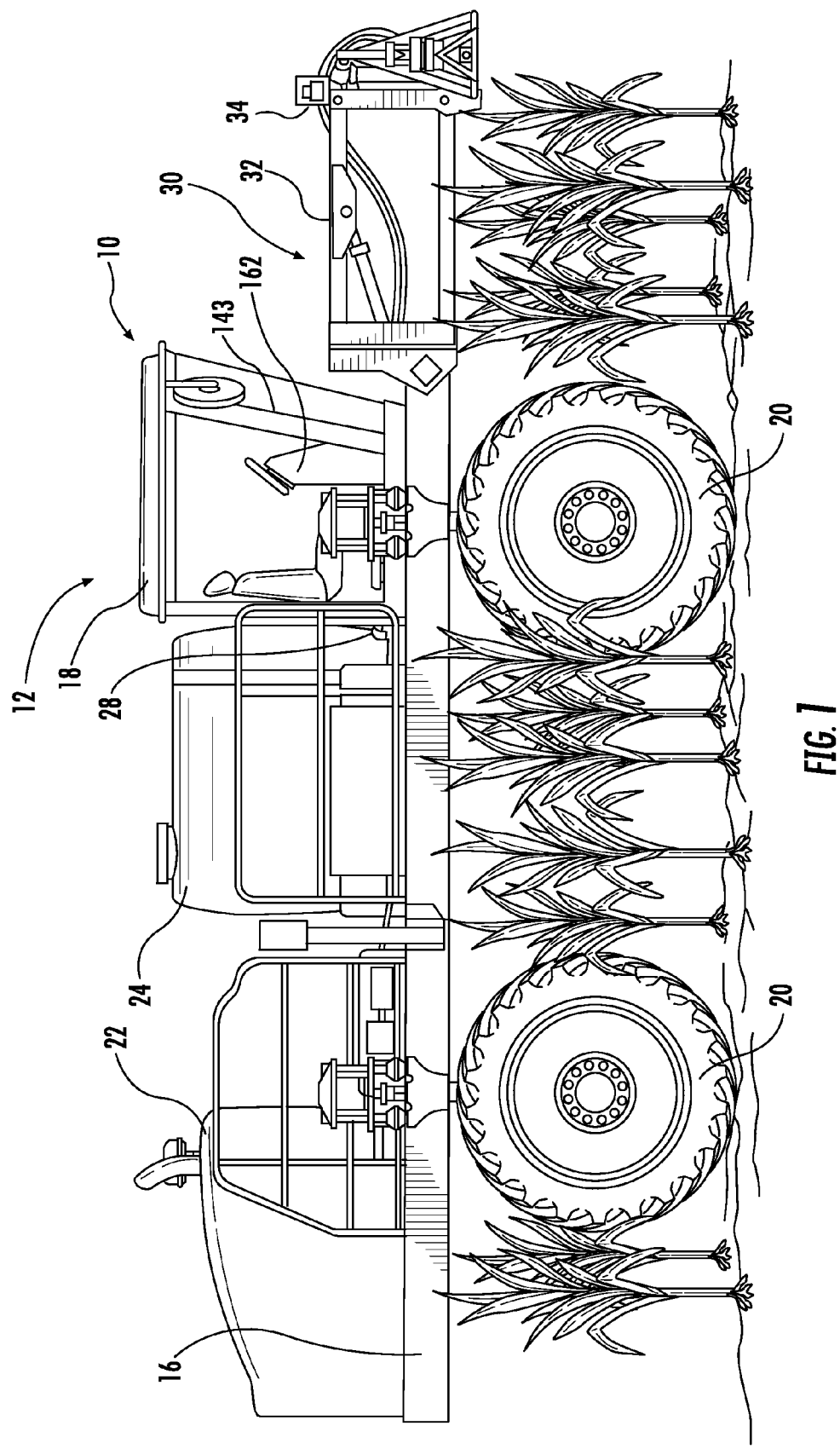
FIG. 1 illustrates a side elevation of the boom sprayer of the present invention.

As shown in FIG. 1, an agricultural vehicle boom sprayer is shown generally as 10. The boom sprayer 10 is an agricultural support vehicle 12 coupled to a boom assembly 14. The boom assembly 14 may be of any desired width, but is preferably at least 18 meters wide and more preferably, more than 27 meters wide.

Figure 2:
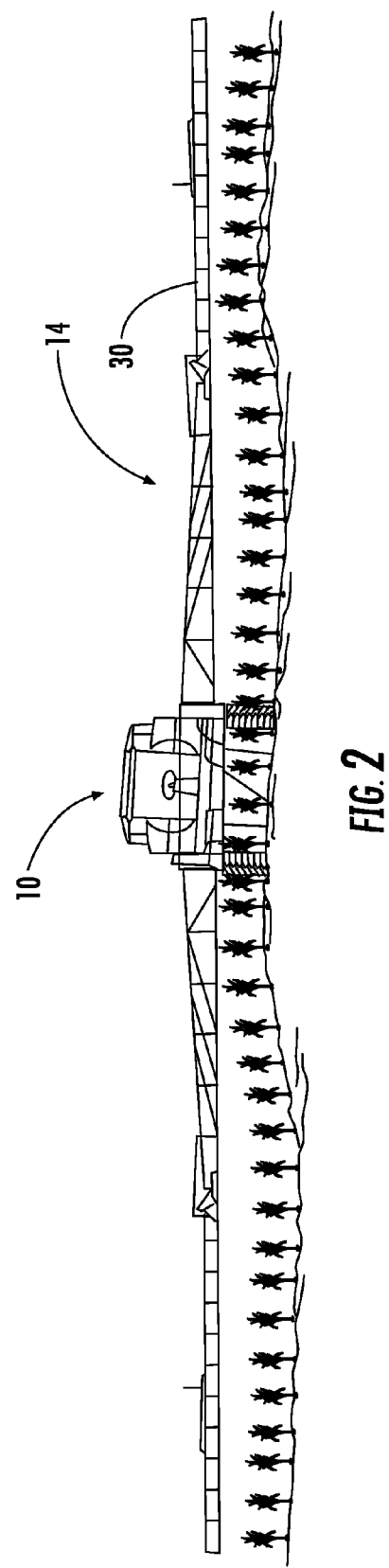
FIG. 2 illustrates a front elevation of the boom sprayer of FIG. 1.
Figure 3:
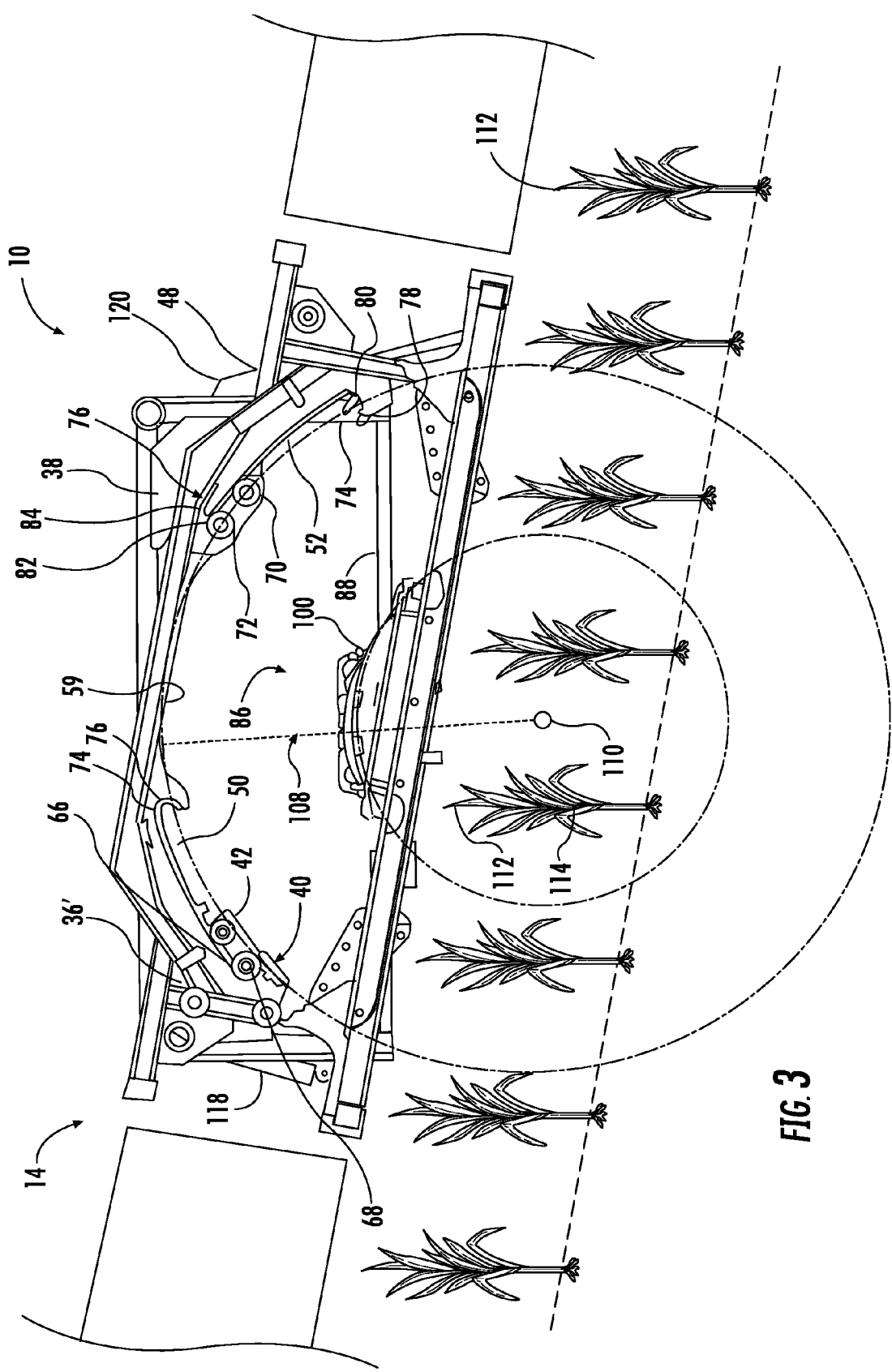
FIG. 3 illustrates a front elevation of the boom assembly of FIG. 1 shown with the boom rotated.
Figure 4:
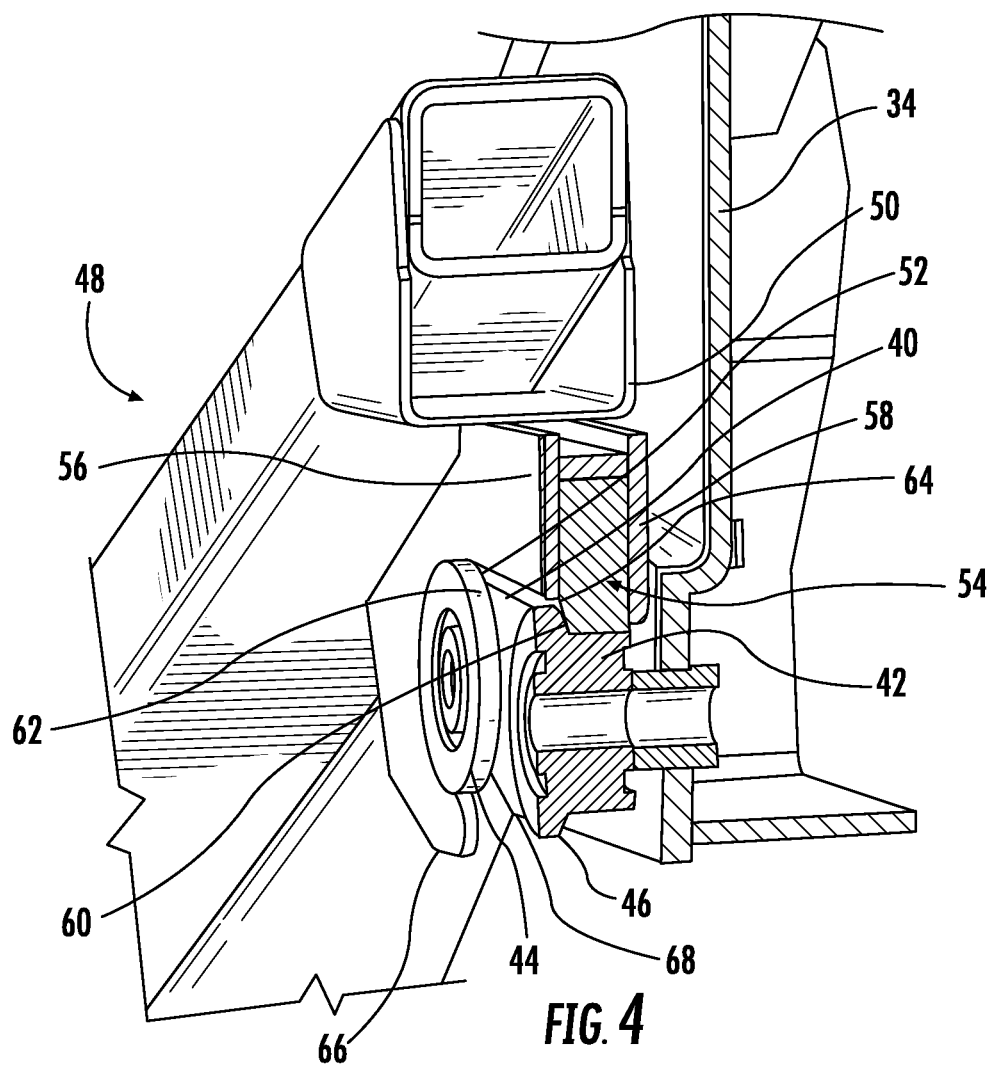
FIG. 4 illustrates a side perspective view of the top of the boom assembly shown in cross section.

While the vehicle 12 may be of any type known in the art, in the preferred embodiment, the vehicle 12 is an STES 12 sprayer manufactured by Hagie Manufacturing Company of Clarion, Iowa. The vehicle includes a frame 16 coupled to a driver's cab 18, wheels 20, and diesel engine 22. The engine 22 preferably produces more than 100 hp, more preferably, more than 200 hp, and most preferably, about 285 hp. The vehicle 12 also includes a fluid container 24, preferably having a capacity greater than 1,000 liters, more preferably, greater than 2,500, and most preferably, about 4,500 liters. A plurality of hoses, such as fluid lines 26, is coupled between the fluid container 24 and spray nozzles 28 provided on the boom assembly 14 (FIGS. 1-2). As shown in FIG. 1, the frame 16 of the support vehicle 12 is coupled to a lift assembly 30. The lift assembly 30 is provided with a pair of four-bar linkage assemblies 32 to raise and lower the boom assembly 14. As shown in FIGS. 1-3, the front of the lift assembly 30 is provided with one or more boom supports, which in the preferred embodiment is a fixed transom 34 engaged to both of the four-bar linkage assemblies 32. The fixed transom 34 is provided with one or more upper supports, which in the preferred embodiment are diagonal braces 36 and 38. Journaled to the first diagonal brace 36 are a pair of rollers 40 and 42. The rollers 40, 42 may be constructed of any suitable dimensions and materials, but, in the preferred embodiment, are constructed of high-density polyethylene and are preferably provided with a lower diameter between 2-50 cm in diameter, more preferably, between 3-20 cm in diameter, and most preferably, between 5-10 cm in diameter. As shown in FIG. 4, the roller 40, 42 are each provided with a flange 44, 46.

As shown in FIG. 3, the boom sprayer 10 is provided with two boom rotators 118, 120. While the boom rotators 118, 120 may be any suitable motivators known in the art, in the preferred embodiment, the boom rotators 118, 120 are preferably linear actuators and more preferably, hydraulic cylinders coupled between the fixed transom 34 and rotating transom 48 to allow the operator to alternately extend and retract the boom rotators 118, 120 to rotate the rotating transom 48 relative to the fixed transom 34. Preferably, the boom rotators 118, 120 are provided with internal stops to prevent the boom rotators 118, 120 from attempting to rotate the rotating transom 48 relative to the fixed transom 34 far enough to damage the rotors 40, 42, 70, 72 against the hooks 66, 68, 76, 78, 80, 82, 84.

As shown in FIGS. 2-3, the boom assembly 14 is provided with one or more pivoting boom assemblies, which in the preferred embodiment is a rotating transom 48. The rotating transom 48 is provided with one or more upper booms, which in the preferred embodiment is a pair of curved tracks 50, 52.

Figure 5:
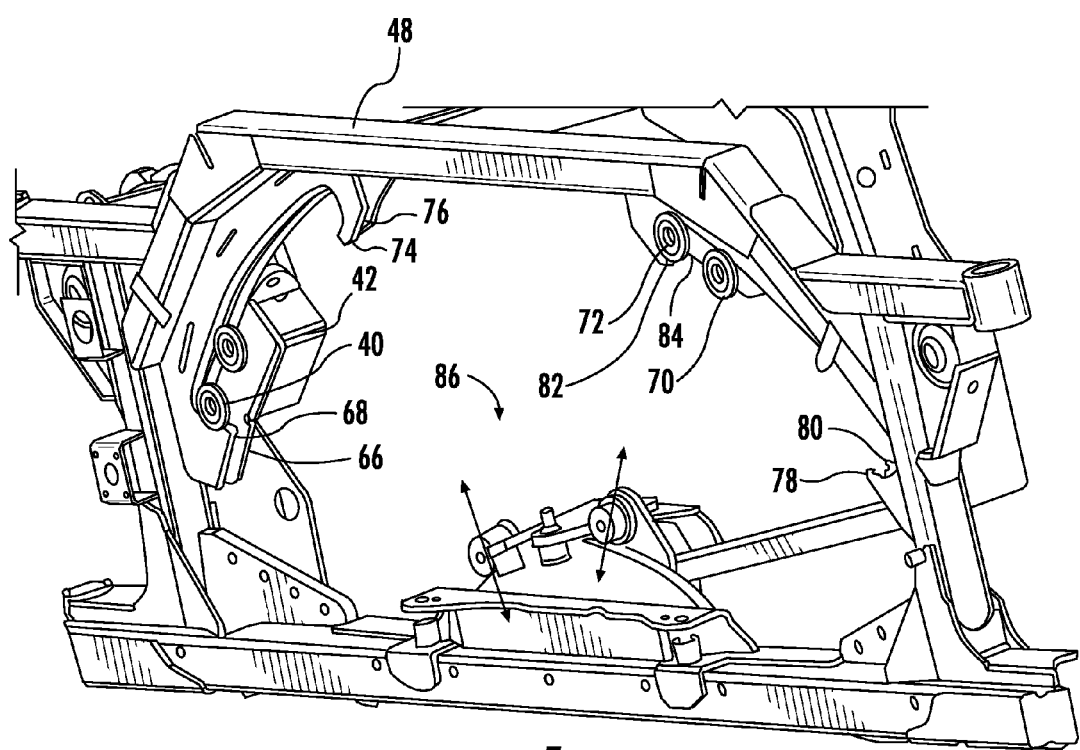
FIG. 5 illustrates a side perspective view of the boom assembly shown fully rotated.
Figure 6:
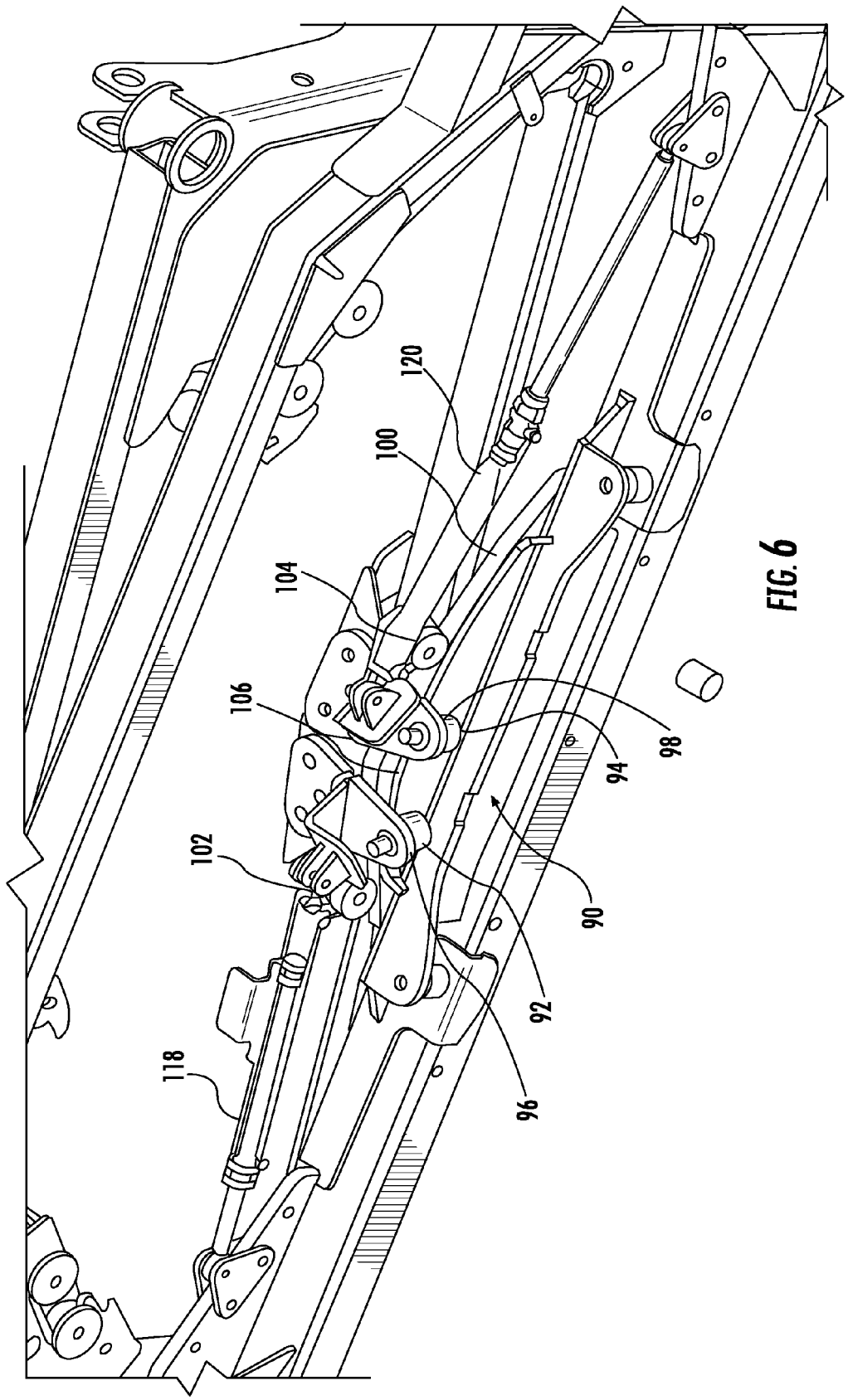
FIG. 6 illustrates a top perspective view of the bottom of the boom assembly.

As shown in FIGS. 3, 4, and 5, the curved track 50 is preferably constructed of a roller guide 54 sandwiched between two steel plates 56, 58. While the roller guide 54 may be constructed of any suitable dimensions and material, in the preferred embodiment, the roller guide is constructed of polyoxymethylene plastic or other suitable low-friction, abrasion-resistant material. As shown in FIG. 4, the roller guide 54 is preferably provided with a chamfered shoulder 60, which fits into mating engagement with the chamfered shoulder 62, 64 of the rollers 40, 42. The chamfered shoulder 60 of the roller guide 54 and the chamfered shoulders 62, 64 of the roller 40, 42 motivate the roller guide 54 to a proper seating engagement with the rollers 40, 42. The roller guide 54 is preferably bolted between the steel plates 56, 58 to allow for easy removal, maintenance, and replacement. The roller guide 54 and rollers 40, 42 collectively form the upper roller track assembly.

As shown in FIGS. 3-4, the steel plates 56, 58 are provided with hooks 66, 68 to capture the roller 40 and prevent over rotation of the rotating transom 48 relative to the fixed transom 34. As shown in FIG. 3, the brace 38 of the fixed transom 34 is also provided with two rollers 70, 72 journaled to the brace 38 and seated into engagement with the roller guide 54. Preferably, the sides of the fixed transom 34 and rotating transom 38 are mirror images of one another. As shown in FIG. 3, the rotating transom 48 is also provided with hooks 74, 76, hooks 78, 80, and hooks 82, 84 to capture the rollers 40, 42, 70, 72 to prevent over-rotation of the rotating transom 48 relative to the fixed transom 34.

In FIGS. 3-5, the boom sprayer 10 is provided with one or more lower supports, which in the preferred embodiment is a lower roller assembly 86. As shown in FIG. 5, the lower roller assembly 86 is a set of rollers 88 coupled to the fixed transom 34 riding along a track assembly 90 provided on the rotating transom 48. The set of rollers 88 has two outside rollers 92, 94 constructed of steel and provided with flanges 96, 98 to prevent the rollers 92, 94 from becoming dislodged from one or more lower booms of the rotating transom 48, which in the preferred embodiment is a floor track 100 of the track assembly 90. The lower roller assembly 86 also has a pair of rollers 102, 104 positioned generally orthogonal to the orientation of the outside rollers 92, 94. Similarly, the rollers 102, 104 ride along a wall track 106 positioned generally orthogonal to the floor track 100. Whereas the flanges 96, 98 of the outside rollers 92, 94 prevent the track assembly 90 and rotating transom 48 from becoming dislodged rearward relative to the fixed transom 34, the rollers 102, 104 prevent the outside rollers 92, 94 from being dislodged rearward of the track assembly 90 and rotating transom 48 relative to the fixed transom 34. The rollers 102, 104 may be constructed of steel polyoxymethylene plastic or any other suitable material. Preferably, the floor track 100 and wall track 106 are constructed of steel, but may be constructed of polyoxymethylene plastic or any other suitable low friction abrasion resistant material. The floor track 100 and lower roller assembly 86 collectively form the lower roller track assembly.

As shown in FIGS. 3-5, the curvature of the roller guide 54 defines a radius 108 having a center point 110. The floor track 100 of the track assembly 90 also defines a radius 112 having the same center point 110. While the center point 110 may be located in a desirable position, in the preferred embodiment, the center point 110 is positioned preferably below the lowermost point at which the fixed transom 34 supports the rotating transom 48 and most preferably below both the fixed transom 34 and rotating transom 48. Preferably, the center point 110 is positioned below the tops 112 of the crops 114 provided in the agricultural field 116.

As shown in FIGS. 2-3, by positioning the center point 110 below the fixed transom 34 and rotating transom 48, the operator is better able to more closely match the angle of the boom assembly 14 relative to the crops 114 as compared to prior art boom assembly systems which rotate the prior art boom assemblies around a pivot point near the top of the fixed transom.

Although the invention has been described with respect to a preferred embodiment thereof, it is to be understood that it is not to be so limited since changes and modifications can be made therein which are within the full, intended scope of this invention as defined by the appended claims.

What is claimed is:
1. An agricultural vehicle comprising:
a frame;
a boom support coupled to the frame, the boom support comprising:
an upper support; and
a lower support;
a pivoting boom assembly comprising:
an upper boom; and
a lower boom;
a first roller assembly coupled to the upper support;
a first track coupled to the upper boom;
a second roller assembly coupled to the lower support;
a second track coupled to the lower boom;
wherein the first roller assembly rides on the first track;
wherein the second roller assembly rides on the second track;
wherein the upper boom is pivotably coupled to the upper support at a first point;
wherein the lower boom is pivotably coupled to the lower support at a second point; and
wherein a pivot point, around which the pivoting boom assembly rotates, is located below the second point.
2. The agricultural vehicle of claim 1, wherein the first track defines a first radius;
wherein the second track defines a second radius; and
wherein the first radius and the second radius originate at the pivot point.
3. The agricultural vehicle of claim 1, further comprising:
a third roller assembly coupled to the lower support;
a third track coupled to the lower boom;
wherein the third roller assembly rides on the third track; and
wherein the third track is oriented generally orthogonal relative to the second track.
4. An agricultural vehicle comprising:
a frame;
a boom support coupled to the frame, the boom support comprising:
an upper support; and
a lower support;
a pivoting boom assembly comprising:
an upper boom; and
a lower boom;
a first roller assembly coupled to the upper boom;
a first track coupled to the upper support;

a second roller assembly coupled to the lower boom; and
a second track coupled to the lower support;
wherein the first roller assembly rides on the first track;
wherein the second roller assembly rides on the second track;
wherein the upper boom is pivotably coupled to the upper support at a first point;
wherein the lower boom is pivotably coupled to the lower support at a second point; and
wherein a pivot point, around which the pivoting boom assembly rotates, is located below the second point.

5. The agricultural vehicle of claim 4, wherein the first track defines a first radius;
wherein the second track defines a second radius; and
wherein the first radius and the second radius originate at the pivot point.

6. The agricultural vehicle of claim 4, further comprising:
a third roller assembly coupled to the lower boom;
a third track coupled to the lower support;
wherein the third roller assembly rides on the third track; and
wherein the third track is oriented generally orthogonal relative to the second track.

7. An agricultural vehicle comprising:
a frame;
a boom support comprising:
  a first roller assembly; and
  a second roller assembly;
a boom assembly comprising:
  a first track engaged with the first roller assembly; and
  a second track engaged with the second roller assembly; and
a plurality of points for supporting the boom assembly on the boom support;
wherein the boom assembly is pivotably engaged with the boom support; and
wherein a pivot point, around which the boom assembly pivots, is located below the plurality of points for supporting the boom assembly on the boom support.

8. The agricultural vehicle of claim 7, wherein the first track defines a first radius;
wherein the second track defines a second radius; and
wherein the first radius and the second radius originate at the pivot point.

9. The agricultural vehicle of claim 7, further comprising:
a third roller assembly coupled to the lower support;
a third track coupled to the lower boom;
wherein the third roller assembly rides on the third track; and
wherein the third track is oriented generally orthogonal relative to the second track.

10. The agricultural vehicle of claim 7, further comprising a boom rotator coupled between the boom support and the boom assembly.

11. The agricultural vehicle of claim 10, wherein the boom rotator is a linear actuator.

12. The agricultural vehicle of claim 7, further comprising a four-bar linkage coupling the frame to the boom support.

13. An agricultural boom assembly, comprising:
a frame;
a boom support;
a four bar linkage coupling the boom support to the frame;
a pivoting boom assembly;
an upper roller track assembly coupling an upper portion of the boom support to an upper portion of the pivoting boom assembly;
a lower roller track assembly coupling a lower portion of the boom support to a lower portion of the pivoting boom assembly;
wherein the upper roller track assembly and the lower roller track assembly contain the rotation of the pivoting boom assembly relative to the boom support around a pivot point; and
wherein the pivot point is located below the lowest point at which the boom support supports the pivoting boom assembly.

14. The agricultural boom assembly of claim 13, wherein the upper roller track assembly defines a first radius, wherein the lower roller track assembly defines a second radius, and wherein the first radius and the second radius originate at the pivot point.

15. The agricultural boom assembly of claim 13, further comprising a boom rotator coupled between the boom support and the pivoting boom assembly.

16. The agricultural boom assembly of claim 15, wherein the boom rotator is a linear actuator.

\* \* \* \* \*